2,895,922

PREPARATION OF OXETANE POLYMERS

Robert F. Goddu, Kennett Square, Pa., assignor to Hercules Powder Company, Wilmington, Del., a corporation of Delaware No Drawing. Application August 27, 1956
Serial No. 606,229

9 Claims. (Cl. 260—2)

This invention relates to an improved method for the preparation of polymers of 3,3-disubstituted oxetanes, also known as 3,3-disubstituted oxacyclobutanes, and, more particularly, to the preparation of polymers of 3,3-bis(chloromethyl)oxetane.

It is known that certain oxetanes, namely, 3,3-disubstituted oxetanes and, particularly, 3,3-bis(chloromethyl)oxetane may be polymerized to give high molecular weight polymers having a molecular weight of at least 10,000 and having physical properties which are highly desirable as applied to the broad field of use for such polymeric materials. However, heretofore, 3,3-bis(chloromethyl)oxetane has been polymerized using Friedel-Crafts catalysts, such as boron trifluoride etherate, aluminum chloride and others, at temperatures between −80° C. and 150° C. to obtain high molecular weight products. Under these conditions, it has been established and disclosed that the higher molecular weight products, suitable for plastics use for example, were obtained only when the polymerization was carried out at room temperature or considerably below. Moreover, with use of the Friedel-Crafts catalysts, it has been established and disclosed that the amount of catalyst required is at a high level ranging between 0.1 and 10% and preferably above 1.0% by weight of the monomer. Needless to say, the requirement of such conditions has seriously detracted from the efficacy of the process and exploitation of its end products as well as imposing limitations in respect to versatility in end product application.

Now, in accordance with this invention, it has been discovered that the polymerization of 3,3-disubstituted oxetane may be carried out in the presence of aluminum alkyl catalysts. Furthermore, it was discovered that high molecular weight polymers of 3,3-bis(chloromethyl)oxetane could be obtained under a considerable range of conditions and, more particularly, under conditions of elevated temperatures and extremely low catalyst levels. Moreover, it was found that the polymers were of better quality with respect to color, stability and level of impurities than those heretofore obtained and that the polymerization process in addition to being more economical afforded improved versatility for handling the products involved.

The following examples will serve to illustrate the preparation of polymers from monomers of 3,3-disubstituted oxetanes and, particularly, 3,3-bis(chloromethyl) oxetane in accordance with this invention. All parts and percentages are by weight throughout the specification unless otherwise designated.

EXAMPLES 1–7

A series of polymerization reactions using various catalysts was conducted in accordance with this invention. These reactions were carried out by heating 13 parts of 3,3-bis(chloromethyl)oxetane monomer with catalyst in a closed reaction vessel containing an atmosphere of nitrogen. The catalysts, conditions of reaction and character of end product are given in the following table.

Table
POLYMERIZATION OF 3,3-BIS(CHLOROMETHYL)OXETANE

| Example No. | Catalyst | Catalyst Concentration, p.p.m. by Wt. of Monomer | Reaction Time | | Monomer Content, Percent [1] | Conversion, Percent [2] | Specific Viscosity [3] |
|---|---|---|---|---|---|---|---|
| | | | (Hrs.) | (Temp., °C.) | | | |
| 1 | Al(C$_2$H$_5$)$_3$ | 525 | 0.25 | 200 | 25 | 75 | 1.76 |
| 2 | Al[CH$_2$CH(CH$_3$)$_2$]$_3$ | 915 | 0.25 | 200 | 22 | 78 | 1.13 |
| 3 | Al(C$_2$H$_5$)$_3$ [a] | 5,200 | 0.75 | Room | | | 4.43 |
| 4 | Al(C$_2$H$_5$)$_3$ [b] | 5,200 | 1.40 | Room | | | 3.96 |
| 5 | ClAl(C$_2$H$_5$)$_2$ | 408 | 0.20 | 200 | 22 | 78 | 1.74 |
| 6 | Al(C$_2$H$_5$)$_3$ [c] | 13,000 | 18 | −25 | | [4] 60 | ([5]) |
| 7 | Al(iBu)$_2$H | 10,600 | 0.2 | 150 | | [6] 91 | 1.16 |

[a] 5% solution of triethylaluminum in heptane.
[b] Same as ([a]) with the exception the monomer contained 0.4% 2,2′-methylene-bis(4-methyl-6-tert-butyl phenol)
[c] 60% by volume tetrachloroethane present as a diluent.
[1] By near infrared analysis of the CCl$_4$ extract.
[2] 100 minus the monomer content determined as in footnote ([1]).
[3] Measured on the product after extraction with CCl$_4$. Specific viscosity of 1% solution of the polymer in cyclohexanone at 50° C.
[4] Weight of polymer isolated and washed monomer-free with methanol.
[5] Polymer would not completely dissolve in cyclohexanone.
[6] Weight of polymer after monomer removed by molecular distillation.

With reference to the above examples, it will be seen that this invention provides an expeditious method of polymerizing 3,3-disubstituted oxetanes at low catalyst level. Although it is not intended that the invention shall be limited to any particular theory of operation, it appears well established that the catalysis involved in accordance with this invention is radically different from the conventional Friedel-Crafts catalysis which heretofore has been utilized for the preparation of polyoxetanes and, particularly, 3,3-bis(chloromethyl)oxetane. This is evident since high polymerization temperatures with a low level of catalyst concentration may be used to obtain high molecular weight products.

Still further with reference to the above examples, it will be seen that distilled or purified 3,3-bis(chloromethyl)monomer, which may contain an antioxidant such as 2,2′-methylene-bis(4-methyl-6-tert-butyl phenol), may be catalytically polymerized to a high molecular weight poly ether at elevated temperatures in the presence of aluminum alkyl catalysts with the examples specifically demonstrating utility in respect to triethylaluminum, diethylaluminum chloride, triisobutylaluminum and diisobutylaluminum hydride. Other catalysts suitable in accordance with this invention include tripropylaluminum, trioctylaluminum, tridodecylaluminum, dimethylaluminum chloride, diethylaluminum bromide, ethylaluminum dichloride, dipropylaluminum fluoride, and diisobutylaluminum fluoride. More particularly, the aluminum alkyl catalysts within the purview of this invention have the general formula Al(X)(Y)(Z) wherein X is an alkyl group and Y and Z are members of the class consisting of alkyl, halogen, hydrogen or haloalkyl. The alkyl substituent of the molecule may be straight chain, branched, or alicyclic. Although aluminum alkyls having not more than eight carbon atoms in the (X) alkyl group are preferred, higher aluminum alkyls may be employed.

The amount of catalyst to be utilized based by weight of the monomer may be varied from about 10 to about 15,000 p.p.m. although no particular advantage accrues at the latter upper limit or even higher as heretofore explained in relation to the unique catalyst mechanism involved. Accordingly, it has been found that the amount of catalyst preferred for processing may be varied from about 30 to about 6,000 p.p.m. with the range from about 100 to about 1,000 p.p.m. preferred for production of high grade products and, particularly, for products to be utilized in association with electrical equipment.

The polymerization temperature in accordance with this invention may be varied over a wide range as, for example from about −50 to about 300° C. However, since polymerizations according to this invention may be carried out at elevated temperatures, a temperature range from about 20 to about 280° C. usually will be employed, with temperatures from about 150 to about 250° C. highly preferable for general purpose utility including polymerizations in bulk or diluent systems as well as in situ polymerizations. The polymerization reaction may be carried out in either an open or closed vessel, and the exclusion of excessive moisture and air has been found necessary. However, this may be accomplished by suitable blanketing, particularly, where in situ polymerization is utilized. However, for the best polymer properties and polymerization performance anaerobic and anhydrous conditions are utilized. Under conditions where diluent polymerization reactions are desired, the diluents of utility are those that do not react either with the monomer or the catalyst. Such diluents include hydrocarons such as heptane, decane or dodecane and halogenated hydrocarons such as carbon tetrachloride, tetrachloroethane and trifluoro-1,1,2-tribromoethane. The polymerization reaction time may be varied over a wide range. In accordance with this invention polymerization reactions have been carried out using various times between five minutes and several hours with no apparent deterimental effects under conditions where a prolonged reaction time is required or desired.

The high molecular weight polymers obtained in accordance with this invention may be separated from the polymerization reaction mass by standard procedures such as quenching the molten reaction mixture in a polymer nonsolvent such as methanol, water or carbon tetrachloride or the mass may be cooled, ground, and if necessary washed. The percent of conversion may be considerably varied in accordance with this invention with conversions as high as 98% having been obtained. Moreover, the polymers obtained has specific viscosities, at 50° C. of a 1% cyclohexanone solution of the polymer, of between 0.3 and 4.0 and even greater, thus showing that polymers having molecular weights in excess of 10,000 and much greater are obtainable. The desired specific viscosity of these polymers for general plastics use is in the order of 1.5–2.0 which is readily attainable by this invention.

From the foregoing, it is evident that there are numerous factors which will influence conditions for the most satisfactory operaton of this invention, the actual requirements of which can be determined only by a detailed study of each set of starting materials and the intermediate and the finished products desired.

For example, although the invention has been particularly demonstrated for the preparation of 3,3-bis (chloromethyl)oxetane as the preferred material, other 3,3-disubstituted oxetanes such as 3,3-bis(fluoromethyl) oxetane, 3,3-bis(bromomethyl)oxetane, 3-chloromethyl-3-methyloxetane, 3,3-dimethyloxetane, and 3,3-bis(phenoxymethyl)oxetane may be similarly polymerized. Moreover, the properties of the end products may be modified by copolymerization of any of the above monomeric materials with each other or with other copolymerizable monomers such as oxetane, and other substituted oxetanes. Additionally, antioxidants, stabilizers, plasticizers and various other additives such as filters, pigments or other colorants may be incorporated with the polymers obtained in accordance with this invention. The specific materials utilized and their method of incorporation will, of course, depend on the intermediate and the finished products desired and, in general, additive incorporation may take place with the monomers, comonomers or prepolymers as well as the end product polymers.

The advantages of this invention over processes heretofore known in the art are multifold. The invention opens the way to a cheaper and more flexible process for preparing polymers of 3,3-disubstituted oxetanes and, particularly, those having molecular weights in excess of 10,000 which expressed in terms of specific viscosity as set forth herein means at least 0.3. Expensive refrigeration equipment for low temperature polymerization to obtain the high molecular weight polymers may be eliminated. In accordance with prior art procedures bulk polymerizations were not feasible for lack of consistent control, whereas with this invention bulk polymerizations are entirely satisfactory. Furthermore, with the use of lower catalyst concentrations by factors of 10 to 1,000, the necessity for aftertreatment of the finished polymer to remove impurities is reduced to a minimum and for some end product applications may be eliminated entirely. The operability of the invention within a wide temperature range allows great flexibility in choosing operating conditions to get the most desirable polymer properties, to control the rate of the reaction, and to get the most economical operating conditions. Continuous polymerizations in extruders and of films on heated plates and belts have been attained. These procedures were impossible according to the processes heretofore known. Furthermore, the polymer obtained in accordance with this invention has better color, that is it is whiter, than polymer heretofore obtained by the prior art processes.

Additionally, the advantages of the invention in respect to flexibility is readily appreciated in considering its applicability as compared to the processes heretofore known. For example, polymerization in situ is now possible thereby opening a new field of application for these polymers. For such uses, the monomer-catalyst mixture may be prepared at room temperature. In coating wire, metal and other high temperature-resistant objects, the object to be coated is heated to a temperature in the order of 250° C., passed through a bath of the monomer-catalyst mixture and is removed therefrom with a thin film of polymer on the surface. In coating paper, fabric and other low temperature-resistant objects, the object is preferably coated with the monomer-catalyst mixture and then subjected to elevated temperature in a heat zone to complete polymerization. In preparing laminates, the materials are coated with the monomer-catalyst mixture, pressed and subjected to elevated temperature to complete polymerization. In potting compound applications, the monomer-catalyst mixture is poured into a mold and then subjected to elevated temperature to complete polymerization. While the foregoing exemplifies some of the applications where in situ polymerization may be employed with advantage, it is not intended to be all inclusive but rather to emphasize some of the advantages over the solvent or dispersion coating systems and other conventional techniques heretofore available for these polymers.

Furthermore, the polymers produced in accordance with this invention are suitable for the various conventional thermoplastic uses such as molding to form various shaped articles; extrusion to form articles such as film, filaments, sheeting, strip and tubing; calendering to form film, sheeting and coating of paper or fabric; and laminating to form counter tops, industrial board and the like.

It will be seen, therefore, that this invention may be carried out by the use of various modifications and changes without departing from its spirit and scope.

What I claim and desired to protect by Letters Patent is:

1. In the method of polymerizing 3,3-disubstituted oxetane of the group consisting of 3,3-bis(halomethyl)oxetane, 3-chloromethyl-3-methyl oxetane, 3,3-dimethyl oxetane, and 3,3-bis(phenoxymethyl) oxetane, the improvement which comprises polymerizing said oxetane in the presence of an aluminum alkyl catalyst said catalyst being present in an amount sufficient to catalyze polymerization of said oxetane to a polymer having a molecular weight of at least 10,000.

2. In the method of polymerizing 3,3-bis(chloromethyl)oxetane, the improvement which comprises polymerizing said oxetane in the presence of an aluminum alkyl catalyst said catalyst being present in an amount sufficient to catalyze polymerization of said oxetane to a polymer having a molecular weight of at least 10,000.

3. In the method of polymerizing 3,3-bis(chloromethyl)oxetane to a polymer having a molecular weight of at least 10,000, the improvement which comprises subjecting 3,3-bis(chloromethyl)oxetane to a temperature from about −50 to about 300° C. in the presence of an amount of an aluminum alkyl catalyst sufficient to catalyze polymerization of said oxetane to a polymer having a molecular weight of at least 10,000.

4. In the method of polymerizing 3,3-bis(chloromethyl)oxetane to a polymer having a molecular weight of at least 10,000, the improvement which comprises subjecting 3,3-bis(chloromethyl)oxetane to a temperature from about −50 to about 300° C. in the presence of an aluminum alkyl catalyst, said catalyst being present in an amount of from about 10 to about 15,000 p.p.m. by weight of said oxetane.

5. The method according to claim 4 in which the aluminum alkyl catalyst is triethylaluminum.

6. The method according to claim 4 in which the aluminum alkyl catalyst is diethylaluminum chloride.

7. The method according to claim 4 in which the aluminum alkyl catalyst is triisobutylaluminum.

8. The method according to claim 4 in which the aluminum alkyl catalyst is diisobutylaluminum hydride.

9. In the method of polymerizing 3,3-bis(chloromethyl)oxetane to a polymer having a molecular weight of at least 10,000, the improvement which comprises subjecting 3,3-bis(chloromethyl)oxetane to a temperature from about 150 to about 250° C. in the presence of an aluminum alkyl catayst, said catalyst being present in an amount of from about 30 to about 6,000 p.p.m. by weight of said oxetane.

References Cited in the file of this patent

Farthing et al.: Journal of Polymer Science, vol. 12, pp. 503–7 (1954).